United States Patent Office 3,463,831
Patented Aug. 26, 1969

3,463,831
DIMERISATION PROCESS
James Keith Hambling, Frimley, near Aldershot, and John Robert Jones, Walton-on-Thames, England, assignors to The British Petroleum Company, Limited, London, England, a corporation of England
No Drawing. Filed Dec. 28, 1966, Ser. No. 605,194
Claims priority, application Great Britain, Jan. 4, 1966, 287/66
Int. Cl. C07c 3/10, 3/18
U.S. Cl. 260—683.15                                    8 Claims

ABSTRACT OF THE DISCLOSURE

A dimerization product containing a significant proportion of linear dimers is obtained by contacting an alpha olefin with a homogeneous catalyst comprising a reaction product of an aluminium halide and a cobalt halide in the presence of an organo-aluminium compound at a temperature in the range $-100°$ to $+200°$ C. under such conditions of pressure that the reactants are maintained in the liquid or partially condensed phase. In an example, propylene was polymerized using a catalyst comprising the reaction product of aluminium chloride and cobalt chloride with diethyl aluminium ethoxide giving a liquid polymer containing 72.5% hexenes, 31.5% of which were linear hexenes.

---

This invention relates to a process for the production of dimers of alpha olefins.

It is known that $AlCl_3$ as the sole catalytic entity is a polymerisation catalyst useful in the production of high molecular weight polymers, especially at low temperatures. If polymerisation is effected under anhydrous conditions at elevated temperature then a polymer containing a relatively high proportion of dimer is obtained in very low yield. The activity of the catalyst can be increased by the presence of water but as the activity of the catalyst is increased and the total yield of polymer product increases the percentage of dimer in the product decreases.

It is also known that $CoCl_2$ by itself or in the presence of an inert diluent is inactive insofar as polymerisation is concerned. Copending application Ser. No. 605,192, filed Dec. 28, 1968, discloses a process for the production of polymers of alpha olefins which process comprises polymerising an alpha olefin in the presence of a homogeneous catalyst comprising a reaction product of an aluminium halide and a transition metal halide at a temperature in the range $-100°$ C. to $+200°$ C. and under such conditions of pressure that the reactants are maintained in the liquid or partially condensed phase.

Polymers ranging from dimers to high molecular weight solid materials may be produced. The nature of the polymer depends on (a) the olefin employed, (b) temperature of reaction, and (c) physical factors affecting contact between the catalyst and feed such as time, catalyst concentration, percent conversion, etc. In general, dimers and low molecular weight oligomers are obtained from simple alpha olefins such as ethylene, propylene and butene-1, while branched olefins, such as isobutene, 3-methylpentene-1 and 4-methylpentene-1 give higher polymers of the viscous or semi-solid variety.

The dimerisation product contains a significant proportion, generally of the order of 25–35% of linear dimers.

We have now discovered that the additional presence of an organo aluminium compound considerably increases both the activity of the catalyst and the proportion of dimers in the product.

Thus according to the present invention there is provided a process for the production of dimers of alpha olefins which process comprises dimerising an alpha olefin in the presence of a homogeneous catalyst comprising a reaction product of an aluminium halide and a transition metal halide and in the presence of an organo aluminium compound at a temperature in the range $-100°$ to $+200°$ C. and under such conditions of pressure that the reactants are maintained in the liquid or partially condensed phase.

The preferred transition metal halides are those of metals of Groups VII and VIII of the Periodic Table according to Mendeleef. Cobalt halides are particularly preferred.

The preferred aluminium halide is aluminium chloride and the preferred cobalt halide is cobalt chloride.

Suitable organo aluminium compounds include aluminium tri-ethyl, di-ethyl aluminium chloride and di-ethyl aluminium ethoxide.

The reaction between the aluminium halide and the transition metal halide is effected by heating them in the presence of a hydrocarbon solvent.

Preferably the aluminium halide is extracted with condensed vapours from a boiling suspension of the transition metal halide in the organic solvent, for example in a Soxhlet system.

Alternatively, the catalyst may be prepared by refluxing a suspension of both the aluminium halide and the transition metal halide in the solvent.

The advantage of the former method is that resublimation of dry aluminium chloride is unnecessary and relatively strong catalyst solutions can be prepared consistently.

The reaction product in either case is sparingly soluble in the solvent but the resulting solution is an effective polymerisation catalyst.

Suitable solvents are cyclohexane, benzene, and chlorobenzene. Heptane and other non-cyclic paraffins are not suitable. Toluene and xylene cannot be used without extensive reaction with aluminum chloride, resulting in tarry products.

Excess aluminium chloride should always be present in the catalyst solution. In consequence, the molar ratio Al:Co should always be greater than 2:1. It is believed that in this case the catalyst solution contains the complex $Co(AlCl_4)_2$ and free $AlCl_3$.

Preferably the molar ratio of aluminium in the organo aluminium compound to cobalt is at least 1:1.

Suitable olefins for dimerisation include those containing from 2–6 carbon atoms per molecule.

Preferred olefins are ethylene, propylene and butene-1.

Preferably the pressure under which dimerisation is effected is in the range 200–2000 p.s.i.g. for ethylene, propylene and butene-1.

Pressures as low as atmospheric may be used for the dimerisation of higher olefins, e.g., 3-methylpentene-1 and 4-methylpentene-1.

The catalyst must be preserved from contact with water, oxygen, alcohols, ethers, amines, phosphines, sulphur compounds, dienes, acetylenes, carbon monoxide and other complexing ligands which displace olefins from transition metal complexes and thereby poison the catalyst or inhibit polymerisation.

Since the catalyst is obtained in solution form no further diluent is necessary for the dimerisation reaction. However, if desired, further solvent may be added as a diluent; alternatively, other inert diluents such as propane, heptane, iso-octane, and (provided temperatures below about 40° C. are to be used) toluene and xylene.

The invention is illustrated by the following examples. It is to be understood that Examples 1 and 3 are provided for purposes of comparison only and that operation in accordance with Examples 1 and 3 are not opera-

Example 1

Cobalt chloride (1 g.) and aluminium chloride (5 g.) were heated under refluxing cyclohexane (100 cc.) for 24 hours. Scrupulous care was taken to ensure that the reagents were anhydrous and that the mixture was not exposed to air or moisture. A blue solution was obtained which contained 770 p.p.m. cobalt as $Co(AlCl_4)_2$. Part of this solution (47 g.) was transferred under nitrogen to a 1 litre rocking autoclave which was pressurised to 600 p.s.i.g. with liquid propylene. The temperature was maintained at 40° C. for 16 hours. The products were then run off into cooled traps (solid carbon dioxide/acetone). After evaporation of the propylene, 189 g. of a liquid polymer remained which contained 47.5% hexenes, the remainder being higher molecular weight polymer. Of the hexenes, 27.5% was linear hexenes. The catalyst activity was 330 polymer/g. cobalt/hour.

Example 2

Cobalt chloride (2 g.) and aluminium chloride (2 g.) were heated under refluxing cyclohexane (400 cc.) for 24 hours. The blue solution obtained was essentially identical to that described with reference to Example 1. To 63.5 g. of this solution was added 0.5 cc. diethyl aluminium ethoxide at room temperature. The catalyst was transferred under nitrogen to a 1 litre rocking autoclave which was pressurised to 600 p.s.i.g. with liquid propylene for 2¼ hours. The temperature was initially 40° C. but rose to 110° C. at one stage due to the exothermic nature of the polymerisation reaction. The reaction products were recovered by the method described with reference to Example 1. The yield of liquid polymer was 492 g. which is equivalent to an activity of 4500 g. polymer/g. cobalt/hour. Of this polymer, 72.5% was hexenes, the remainder being higher molecular weight polymer. Of the hexenes, 31.5% was linear hexenes.

Example 3

Dry cobalt chloride (2 g.), resublimed aluminium chloride (2 g.) and cyclohexane (400 cc.) were heated under reflux for 24 hours under an atmosphere of dry nitrogen. A blue solution was obtained which contained 340 p.p.m. cobalt and 810 p.p.m. aluminium. Part of this solution (46 g.) was used for propylene polymerisation as described in Example 1 at 650 p.s.i. for 16½ hours, the temperature being between 40° and 57° C. The yield of liquid polymer was 322 g. of which only 3.2% was hexenes.

Example 4

To 51 g. of the blue catalyst solution prepared in Example 3 was added 0.20 g. aluminium triethyl dropwise at 0° C. with stirring, maintaining an atmosphere of dry nitrogen in the apparatus. The mixture was transferred to a 1 litre rocking autoclave for propylene polymerisation as described in Example 1. After 4.8 hours at 40°–64° C. and 600 p.s.i., 573 g. of liquid polymer was obtained containing 62% hexenes of which 33% was linear hexenes and 38% of higher oligomers.

Example 5

To 27 g. of the blue catalyst solution prepared in Example 3 was added 0.40 g. aluminium triethyl dropwise at 0° C. with stirring maintaining an atmosphere of dry nitrogen in the apparatus. In a propylene polymerisation test as in Example 1 59 g. of liquid polymer was obtained in 4 hours at 40° C. and 600 p.s.i. The polymer contained 88% hexenes of which 27% was linear hexenes, and 12% higher oligomers.

Example 6

Dry nickel chloride (1 g.), resublimed aluminium chloride (5 g.) and purified cyclohexane (200 cc.) were heated in a flask under reflux and in an atmosphere of dry nitrogen for 24 hours. A yellow solution was obtained. To 34 g. of this solution was added 0.30 g. aluminium diethyl ethoxide drop-wise at 0° C. with stirring and maintaining an atmosphere of dry nitrogen in the apparatus. The mixture was used for propylene polymerisation as in Example 1. In 5 hours at 40° C. and 550 p.s.i. 116 g. liquid polymer was obtained containing 93% hexenes of which 28% was linear hexenes and 7% higher oligomers.

What we claim is:

1. A process for the production of dimers of alpha mono-olefins containing 2–6 carbon atoms per molecule which comprises dimerising the alpha mono olefin in the presence of a homogeneous catalyst comprising the reaction product of aluminum trihalide and a cobalt halide with an organo aluminum compound selected from the group consisting of aluminium triethyl, diethyl aluminium chloride and diethyl aluminium ethoxide, at a temperature in the range −100 to +200° C. and under such conditions of pressure that the reactants are maintained in the liquid or partially condensed phase.

2. A process according to claim 1 wherein the aluminium trihalide is aluminium chloride.

3. A process according to claim 1 wherein the molar ratio of aluminium in the organo aluminium compound to cobalt is at least in the ratio of 1:1.

4. A process according to claim 3 wherein the molar ratio of aluminium to cobalt is greater than 2:1.

5. A process according to claim 1 wherein the alpha mono-olefin is a member selected from the group consisting of ethylene, propylene and butene-1.

6. A process according to claim 1 wherein the pressure under which dimerisation is effected is in the range 200–2000 p.s.i.g.

7. A process according to claim 1 wherein the alpha mono-olefin is a member selected from the group consisting of 3-methylpentene-1 and 4-methylpentene-1.

8. A process according to claim 1 wherein the pressure under which dimerisation is effected is atmospheric.

References Cited

UNITED STATES PATENTS

| | | |
|---|---|---|
| 2,954,367 | 9/1960 | Vandenberg. |
| 2,969,408 | 1/1961 | Nowlin et al. |
| 3,042,626 | 7/1962 | Bruce et al. |
| 3,066,126 | 11/1962 | Porter et al. |
| 3,131,171 | 4/1964 | Calfee. |

PAUL M. COUGHLAN, JR., Primary Examiner

U.S. Cl. X.R.

252—429